May 12, 1959 C. J. BARECKI 2,886,259
SAFETY EQUIPMENT FOR VEHICLE OCCUPANTS
Filed Sept. 4, 1956 4 Sheets-Sheet 1

INVENTOR
Chester J. Barecki
BY John S. Braddock
ATTORNEY

May 12, 1959  C. J. BARECKI  2,886,259
SAFETY EQUIPMENT FOR VEHICLE OCCUPANTS
Filed Sept. 4, 1956  4 Sheets-Sheet 2

INVENTOR
Chester J. Barecki
BY John S. Braddock
ATTORNEY

May 12, 1959          C. J. BARECKI          2,886,259
SAFETY EQUIPMENT FOR VEHICLE OCCUPANTS
Filed Sept. 4, 1956          4 Sheets-Sheet 3
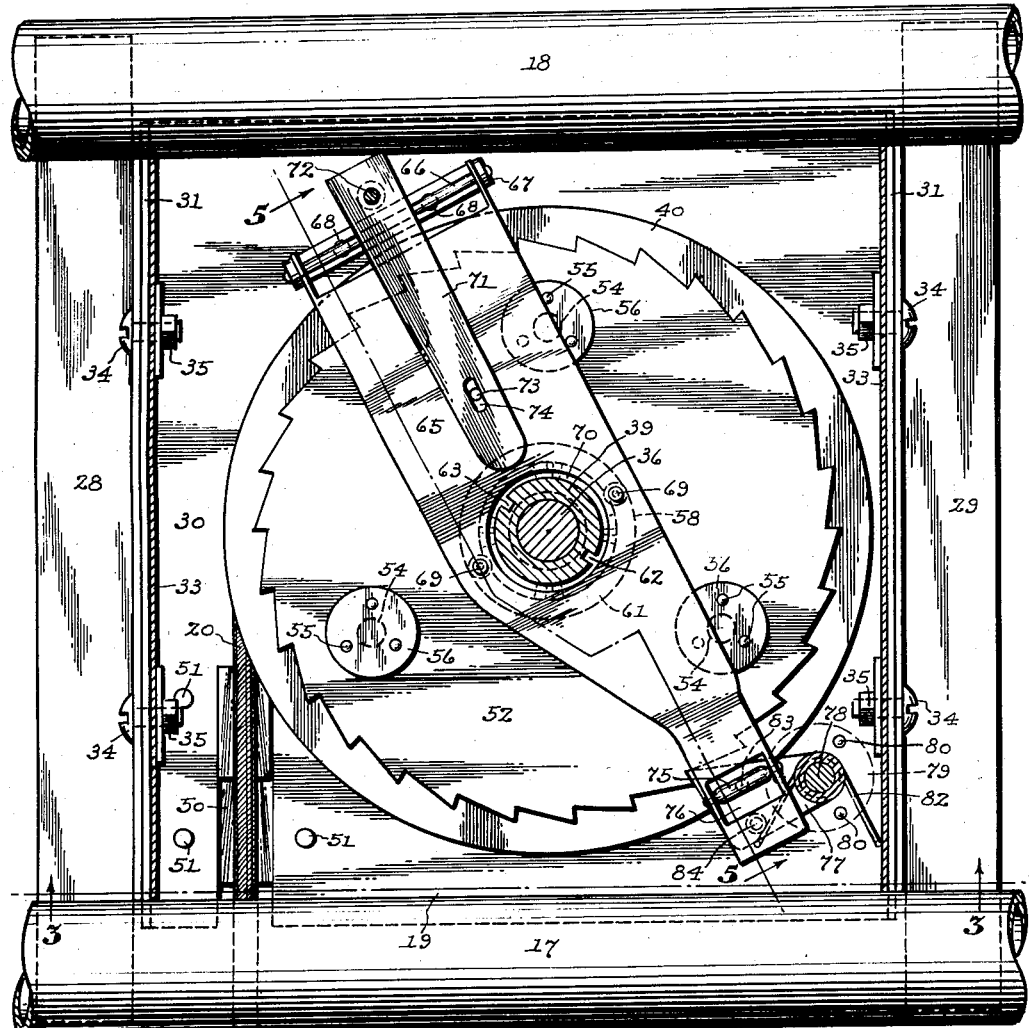
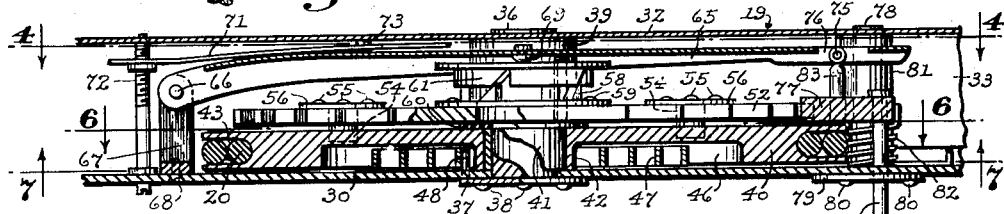
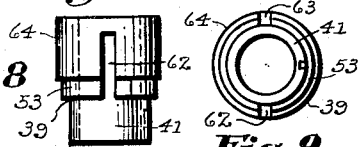
INVENTOR
*Chester J. Barecki*
BY *John S. Braddock*
ATTORNEY May 12, 1959 C. J. BARECKI 2,886,259
SAFETY EQUIPMENT FOR VEHICLE OCCUPANTS
Filed Sept. 4, 1956 4 Sheets-Sheet 4

INVENTOR
Chester J. Barecki
BY John S. Braddock
ATTORNEY

United States Patent Office 2,886,259
Patented May 12, 1959

---

2,886,259

SAFETY EQUIPMENT FOR VEHICLE OCCUPANTS

Chester J. Barecki, Grand Rapids, Mich., assignor to American Seating Company, Grand Rapids, Mich., a corporation of New Jersey Application September 4, 1956, Serial No. 607,709

1 Claim. (Cl. 242—107.4)

The present invention relates to safety equipment for vehicle occupants.

The primary objects of the invention are to provide safety equipment whereby the occupants of moving vehicles, particularly automobiles, are prevented from being suddenly thrown forward in the vehicle in the event of a crash, thus to prevent such occupants being seriously injured or killed by impact against parts of the vehicle; to provide such safety equipment which in its operation is not dependent on the vehicle seat, which is usually inadequately anchored to the floor, but which is secured to and dependent on the vehicle's frame itself; to provide an improved and simplified inertia-locking take-up reel for such safety equipment; and to provide such equipment which when installed in an automobile or other vehicle presents a neat appearance and which is particularly efficient in its intended use.

An illustrative embodiment of the invention is shown in the accompanying drawings, wherein:

Figure 4 is a horizontal sectional view of the same taken on lines 4—4 of Figures 3 and 5;

Figure 5 is a horizontal sectional view of the same taken on line 5—5 of Figure 4;

Figure 8 is a side elevational view of a bushing member per se of the reel; and

Figure 9 is a bottom plan view of said bushing member.

Figure 1:
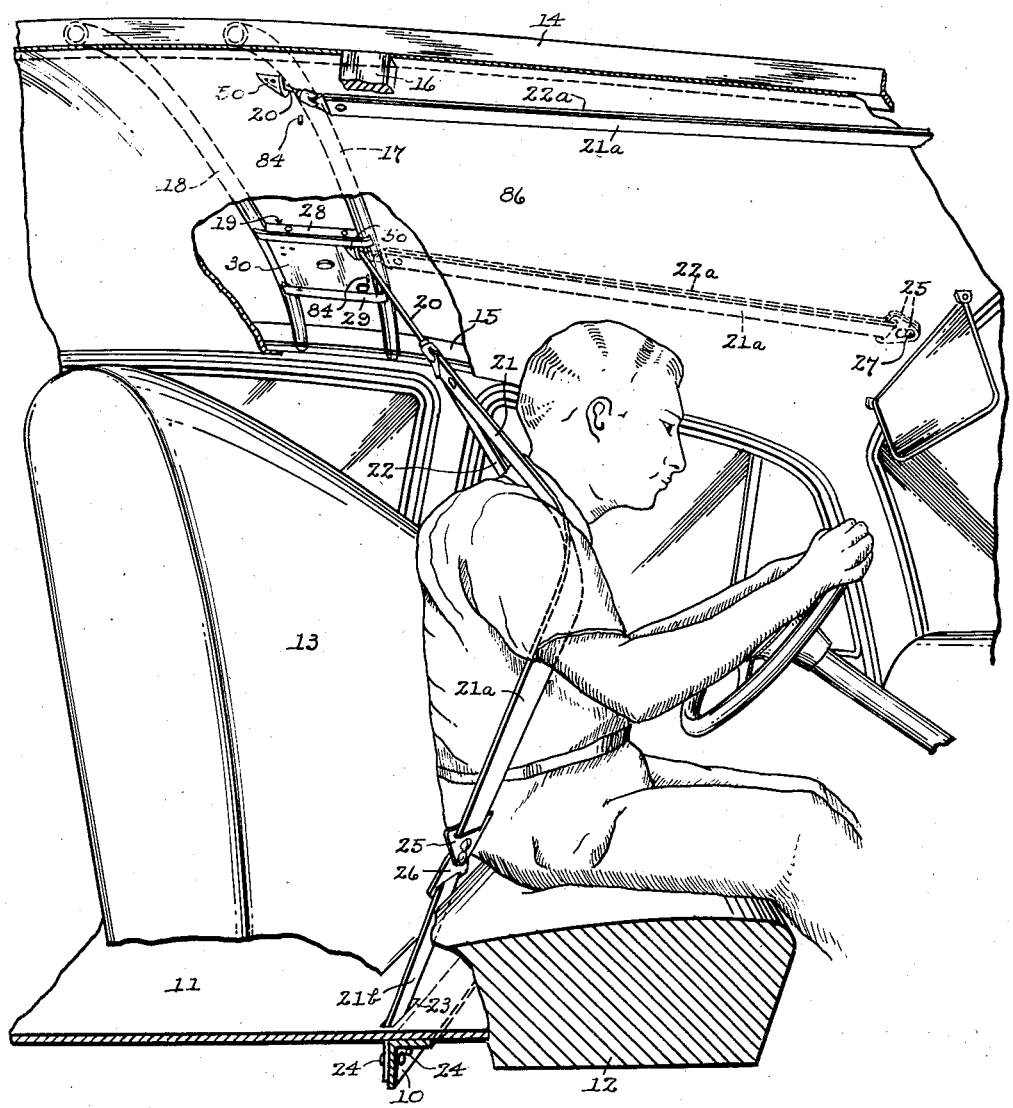
Figure 1 is a fragmentary perspective view of the interior of a motorcar with two sets of the new safety equipment installed therein for the use of the front seat passenger and the driver of the vehicle.
Figure 2:
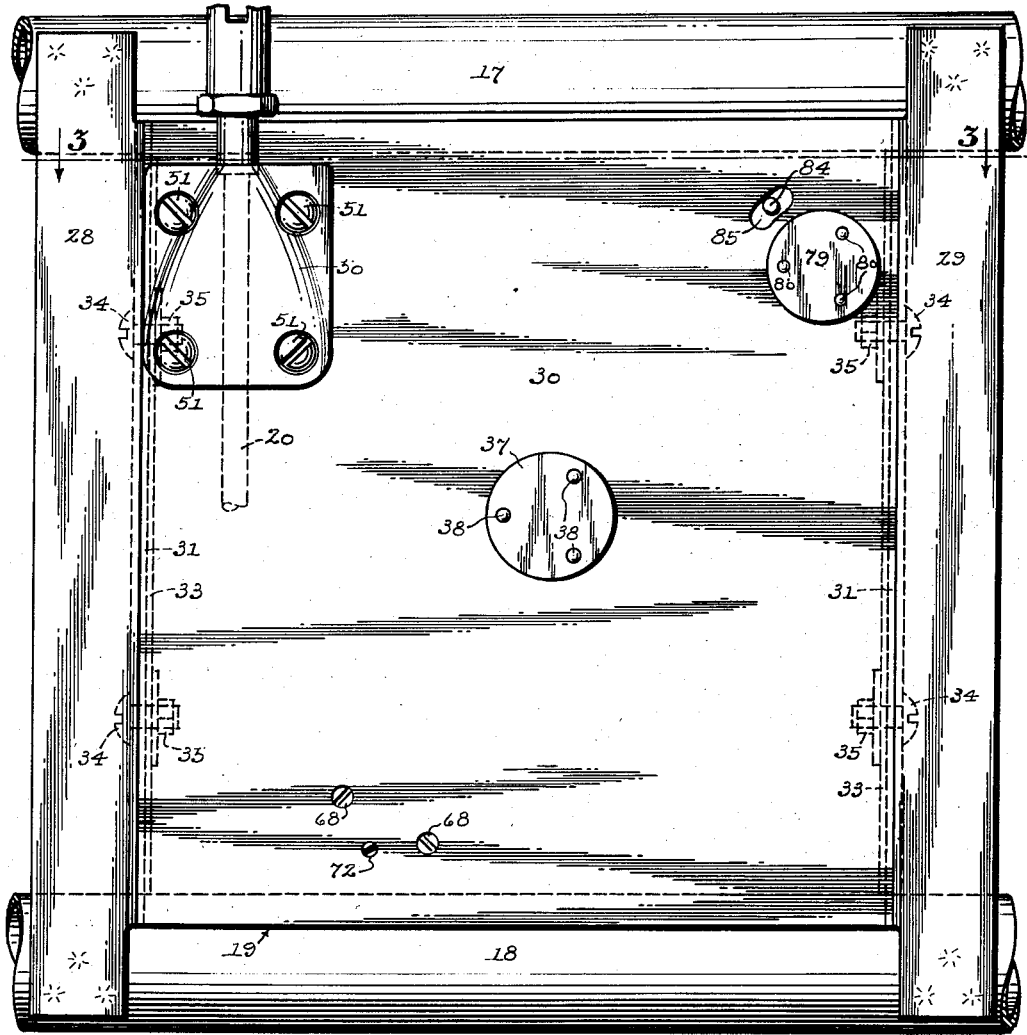
Figure 2 is a bottom plan view of the new inertia-locking shoulder harness cable take-up reel.

Referring now in detail to these drawings and referring first particularly to Figure 1, the steel frame of the vehicle there shown includes floor supports and ceiling supports. One of the transverse angle-bar floor supports is shown in the drawing and is designated 10. The vehicle floor 11, chair seat 12 and chair back 13 are mounted on the floor supports. Ceiling supports, here shown as forwardly-rearwardly extending side angle-bars 14, 15, are rigidly connected to the floor supports and to other parts of the frame by uprights, a fragment of one such upright being shown at 16.

According to the invention, a pair of spaced transverse tubular metal bars 17, 18 span the vehicle's ceiling, being welded at their opposite ends to the ceiling supports 14, 15. The bars 17, 18 serve as additional ceiling supports and further strengthen the vehicle's frame, and they also serve as mountings for the inertia-locking cable takeup reels generally designated 19. As here shown two of the reels 19 are provided, one for each of two occupants of the vehicle's front seat 12.

An elongated, flexible, non-elastic restraining element is provided for each chair occupant, each of said elements comprising a cable 20 connected to a reel 19 and to a shoulder harness which is bifurcated to provide separate shoulder straps 21, 22 which extend forwardly and around the chair occupant's shoulders as shown. The lower ends of the shoulder straps 21, 22 pass through slots 23 in the vehicle's floor 11 and are secured as by means of rivets 24 to the floor support 10. Thus the restraining elements are connected to the ceiling support and to the floor support of the vehicle, rearwardly of the occupants, so that the occupants may be restrained from being thrown forwardly in the vehicle in the event of a crash or upon abrupt deceleration of the vehicle for other cause. Unlike other safety devices this new arrangement is not dependent on the seat moorings, which often have been found inadequate, to restrain the occupant against forward movement, because the restraining elements are connected directly to the vehicle's frame at both top and bottom.

Each of the shoulder harness straps 21, 22 may for convenience be divided at the approximate level of the chair seat into two parts, the upper parts of the straps being designated 21a and 22a, and the lower parts thereof being designated 21b and 22b. These parts have cooperative pin-and-keyhole attachment fittings 25, 26 respectively by means of which they may quickly be connected and disconnected. When the harness is not in use, the fittings 25 may be attached to pins 27 in the forward ceiling of the car so that upper parts 21a and 22a of the restraining element are up against the ceiling and out of the way, as shown.

Details of one of the automatic inertia-locking cable takeup reels 19 are shown in Figures 2 through 7. Spaced, forwardly-rearwardly disposed angle bars 28, 29 are secured as by means of welding to the tubular metal bars 17, 18 and between the angle bars 28, 29 there is secured a housing comprising a base plate 30 having upstanding side flanges 31 and a cover plate 32 having depending side flanges 33. The housing is secured to the angle bars 28, 29 by means of bolts 34 passing through the angle bars and the side flanges 31 and 33 and having nuts 35. A center pin 36 extends through the housing at the latter's approximate center and has a flange 37 which is secured to the base plate 30 as by means of rivets 38. A bushing 39, shown per se in Figures 8 and 9, is disposed on the center pin 36.

A cable drum 40 is rotatably mounted on the center pin 36 with the narrow lower portion 41 of bushing 39 interposed between the center pin and the drum's hub 42, and the bushing is keyed to the drum for rotation therewith. The drum 40 has a peripheral cable-receiving groove 43 and a recess 44 (see Figure 7) in the bottom thereof, in which recess is seated a cylindrical fitting 45 swedged on the inner end of the cable 20 thus to secure the cable to the drum. The drum 40 also has an annular well 46 in the bottom thereof in which is disposed a spiral spring 47 having its inner end connected to a pin 48 extending upward from the housing's base 30 and having its outer end connected to a lug 49 on the drum 40. The spiral spring 47 normally yieldingly urges the drum in a direction for winding the cable 20 thereon. A guide 50 secured to the housing's base 30 as by means of screws 51, guides the cable into the housing and onto the drum 40.

A ratchet wheel 52 having peripheral ratchet teeth is rotatably mounted on the center pin 36 with the medium diameter, middle portion 53 of the bushing 39 interposed between the center pin and the ratchet wheel. Studs 54, here shown as three in number, are secured to the ratchet wheel as by means of rivets 55 passing through flanges 56 on the studs and through the ratchet wheel. These studs extend downwardly into arcuate slots 57 in the drum 40, and the ratchet wheel and drum are by this means permitted limited rotary movement relative to each other. The ratchet wheel 52 has also a camming ring 58 secured to its upper surface as by means of rivets 59, said camming ring 58 having camming teeth thereon. A nylon washer 60 is desirably interposed between the ratchet wheel 52 and the drum 40, for smooth operation and long-wearing quality.

Figure 3:
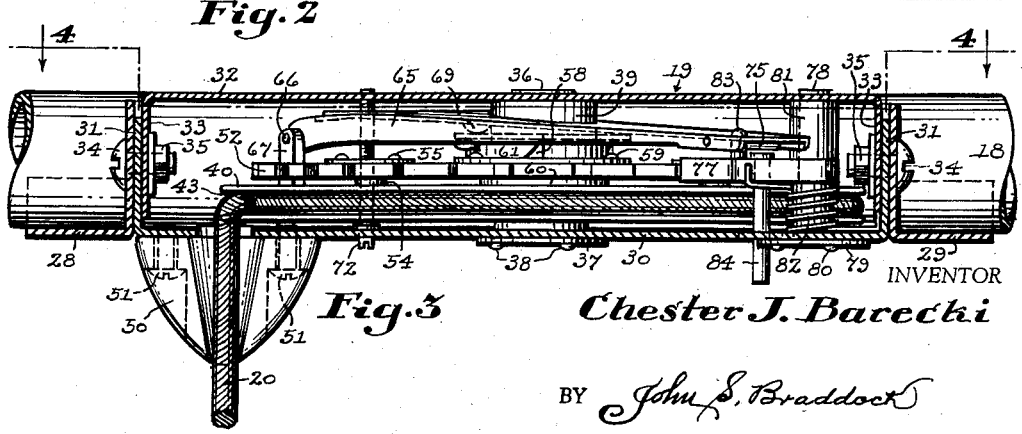
Figure 3 is a vertical sectional view of the reel taken on lines 3—3 of Figures 2 and 4.
Figure 6:
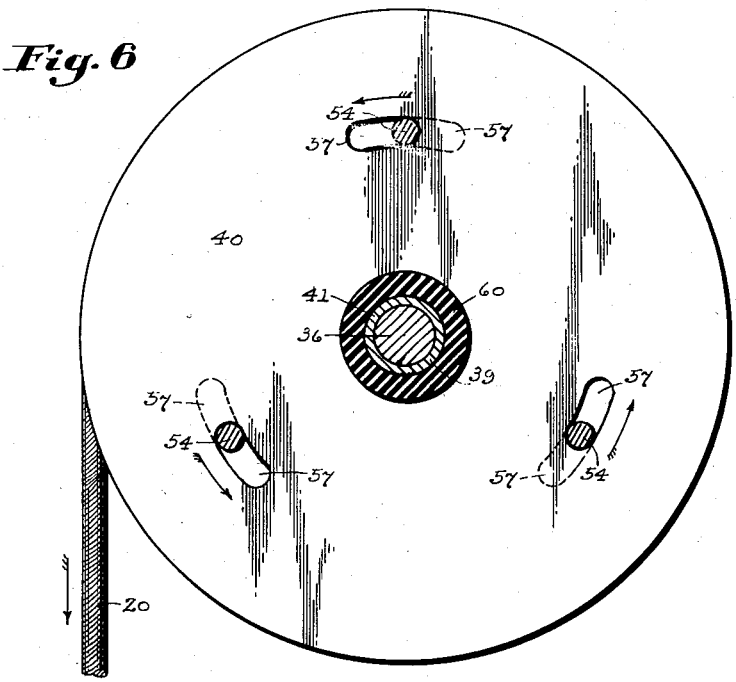
Figure 6 is a horizontal sectional view of parts of the reel taken on line 6—6 of Figure 5, looking down.
Figure 7:
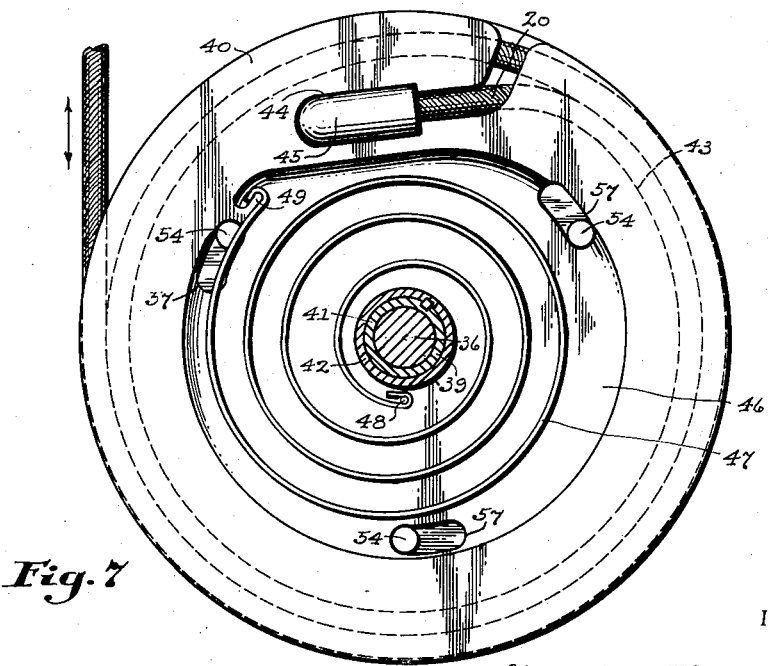
Figure 7 is a horizontal sectional view of parts of the reel taken on line 7—7 of Figure 5, looking up.

A cam ring 61 having cam notches thereon which engage with the teeth of the camming ring 58, is keyed at 62, 63 on the widest, upper end portion 64 of the bushing 39 so as to be rotatable with the bushing and slidable thereon between its lowered position seen in Figure 3 and its raised position seen in Figure 5. A lever 65 is fulcrumed at 66 on a bracket 67 secured to the housing's base 30 as by means of screws 68. Rivets 69 set into the middle portion of the lever 65 bear against the upper surface of the cam ring 61, and the lever 65 has a central opening 70 (see Figure 4) therethrough, through which pass the center pin 36 and bushing 39 to permit free up and down swinging movement of the lever. A leaf spring 71 bears against the upper surface of the lever 65 to urge the lever downwardly, and the force which the spring exerts on the lever can be adjusted by turning the screw 72 on which the spring is threadedly mounted. A pin 73 on the lever extending into a slot 74 in the spring 71 keep these parts in alignment. The outer end of the lever 65 (toward the right as seen in Figures 3, 4 and 5) is provided with a detent in the form of a roller 75 turnably mounted in a window 76 in the lever. The purpose of this detent will be more fully described hereinafter.

A pawl 77 is turnably mounted on a shouldered post 78 secured between the housing's base 30 and its cover 32, the post having a lower flange 79 secured to the base 30 as by means of rivets 80. A spacer collar 81 is interposed between the pawl 77 and the housing's cover 32. A helical spring 82 circumscribes the lower portion of the post 78 and has its opposite ends bearing against the housing and the pawl 77 so that the pawl is normally urged from a position of disengagement from the ratchet wheel 52 toward a position of engagement therewith. The pawl 77 has a pin 83 adapted to engage either behind the roller detent 75 on lever 65 as seen in Figure 3 or under said detent 75 as seen in Figures 4 and 5, depending on the positions of these parts as hereinafter described. The pawl 77 also has a release pin 84 depending therefrom through a slot 85 in the housing's base plate 30, by means of which release pin the pawl 77 can be manually disengaged from the ratchet wheel 52.

The cable take-up reels 19 are completely concealed between the ceiling fabric 86 and the top of the car except for the cable guide 50 and the manual release pin 84 which depend through tailored openings in the ceiling fabric.

*Operation*

Upon taking his seat in the vehicle, the occupant detaches the fittings 25 from pin 27 on the forward ceiling of the car, and attaches these fittings to fittings 26 on the lower part 21b of shoulder strap 21 and on the lower part 22b (not seen in the drawing) of shoulder strap 22. He then moves the release pin 84 to make certain that the parts of the reel 19 are set for automatic inertia-operation in the event of a crash as illustrated in Figure 3 wherein the pawl 77 is held in a position of disengagement from the ratchet wheel 52 by the engagement of the pawl's pin 83 behind the roller detent 75 of the lever 65, said lever 65 being now in its lowered position. The force of spring 71 pressing downwardly against lever 65 maintains cam ring 61 in its lowered position of engagement with the camming ring 58 on the ratchet wheel 51, thus biasing the ratchet wheel in an unwinding direction relative to the drum 40. In this position of the parts the occupant is accorded full freedom of movement, while any slack in the harness cable 20 is always taken up on the reel's cable drum 40 by reason of the constant urging of the drum in its winding direction by the spiral spring 47.

With the vehicle in forward motion, any sudden deceleration thereof as in the event of a crash tends to throw the occupant forwardly in the vehicle. This is prevented by the use of the equipment herein disclosed. An abrupt jerk on the harness cable 20 immediately results in sudden urging of the cable drum 40 in the unwinding direction. When this occurs, ratchet wheel 52 by its own inertia lags behind the drum, being permitted a slight rotative movement relative to the drum by reason of the drum's arcuate slots 57 into which the ratchet wheel's studs 54 extend. Cam ring 61, being keyed to bushing 39 which in turn is keyed to the drum, rotates with the drum but is cammed upwardly from its position seen in Figure 3 to its position seen in Figure 5 by the camming ring 58 on the ratchet wheel 52. When cam ring 61 is thus moved upwardly it swings lever 65, against which it bears, upwardly also. This upward movement of lever 65 disengages the lever's roller detent 75 from pin 83 on pawl 77 thus permitting the helical spring 82 to snap the pawl into engagement with the ratchet wheel 52 as seen in Figures 4 and 5. The drum is thus prevented from turning movement in the unwinding direction and the occupant is snubbed rearwardly in his seat. However, the drum is still permitted to ratchet back in the winding direction to take up any slack which might occur in the cable.

After the reel has been tripped to lock as previously described, it can be manually reset or "cocked" for inertia operation by moving the release pin 84 to the right as viewed in Figure 4 thus disengaging pawl 77 from the ratchet wheel 52 and moving the pawl's pin 83 out from under the detent 75 on lever 65, whereupon the leaf spring 71 presses lever 65 downwardly so that the pawl's pin 83 again engages behind the lever's detent 75 to maintain the parts in their set positions.

Although it is preferable to employ the automatic inertia-locking reel as described, so that the occupant has full freedom of movement under ordinary driving conditions, the invention also comprehends the direct attachment of the shoulder harness to both the floor support and the ceiling support of the vehicle's frame. The occupant would thus be held rearwardly in his seat at all times, by means connected to the frame of the vehicle rather than by means connected only to the seat.

While but one specific embodiment of the invention has been herein shown and described, it will be understood that numerous details of construction may be altered or omitted without departing from the spirit of the invention as defined by the following claim.

I claim:

A generally flat automatic reel assembly comprising: a housing having substantial length and width and relatively little depth; a short center pin extending through said housing in the direction of its depth; a relatively flat drum rotatably mounted on the center pin and having a peripheral cable-receiving groove therein and a plurality of arcuate slots therein arranged coaxially about the center pin; a cable connected to the drum for winding thereon and unwinding therefrom; spring means for normally yieldingly urging the drum in the winding direction; a ratchet wheel rotatably mounted on the center pin adjacent the drum and provided with studs extending into said arcuate slots whereby the ratchet wheel is permitted limited rotation relative to the drum, said ratchet wheel having peripheral teeth and having also a camming ring coaxial therewith and extending therefrom oppositely from the drum; a bushing mounted on said center pin for rotation with the drum and having a keyway therein; a cam ring keyed on the bushing for rotation therewith and longitudinal sliding movement thereon, said cam ring having cam surfaces in engagement with the camming ring on the ratchet wheel; a lever fulcrumed on the housing for swinging movement about an axis normal to that of the drum, said lever being provided with a detent on its end opposite the fulcrum and said lever bearing at its middle against said cam ring; spring means mounted in the housing for normally urging the lever and the cam ring toward the ratchet wheel, the cam ring thus normally urging the ratchet wheel by its camming ring in the unwinding direction toward its limit of movement relative to the drum; a pawl mounted in the housing for turning movements to positions of ratchet-engagement with the ratchet wheel and of disengagement therefrom; spring means urging the pawl toward its said position of ratchet-engagement; a pin on the pawl adapted for engagement behind the detent to normally maintain the pawl out of engagement with the ratchet wheel, in which position of disengagement of the pawl the drum, the ratchet wheel and the cam ring rotate in unison during winding and unwinding movements of the drum, said drum being movable relative to the ratchet wheel in response to an abrupt jerk on the cable whereby the ratchet wheel lags behind the drum by reason of its own inertia and the camming ring cams the cam ring and the lever outwardly thus disengaging the detent from the pin on the pawl and permitting said pawl to move into engagement with the ratchet wheel; and a release pin rigidly connected to the pawl for movement therewith and projecting exteriorly of the housing through a slot in said housing whereby the pawl can be manually disengaged from the ratchet wheel and the pin on the pawl again engaged behind the detent.

References Cited in the file of this patent

UNITED STATES PATENTS

| | | |
|---|---|---|
| 2,071,903 | Shively | Feb. 23, 1937 |
| 2,263,348 | Barros | Nov. 18, 1941 |
| 2,701,693 | Nordmark et al. | Feb. 8, 1955 |
| 2,708,555 | Heinemann et al. | May 17, 1955 |
| 2,726,826 | Hoven et al. | Dec. 13, 1955 |
| 2,760,737 | Barecki | Aug. 28, 1956 |